United States Patent [19]
Koivunen

[11] Patent Number: 5,577,102
[45] Date of Patent: Nov. 19, 1996

[54] METHOD AND ARRANGEMENT FOR PROCESSING SHORT MESSAGES IN A CELLULAR NETWORK

[75] Inventor: Seppo Koivunen, Hyvinkää, Finland

[73] Assignee: Nokia Telecommunications Oy, Espoo, Finland

[21] Appl. No.: 351,430

[22] PCT Filed: Jun. 1, 1993

[86] PCT No.: PCT/FI93/00235

§ 371 Date: Jan. 20, 1995

§ 102(e) Date: Jan. 20, 1995

[87] PCT Pub. No.: WO93/26131

PCT Pub. Date: Dec. 23, 1993

[30] Foreign Application Priority Data

Jun. 12, 1992 [FI] Finland ................................. 922751

[51] Int. Cl.[6] .................................................. H04Q 7/22
[52] U.S. Cl. .............................................. 379/59; 455/33.1
[58] Field of Search ................................ 379/58, 59, 63, 379/201, 207; 455/33.1, 53.1, 54.1

[56] References Cited

FOREIGN PATENT DOCUMENTS

| 684746 | 11/1995 | European Pat. Off. . |
|---|---|---|
| 92/14330 | 8/1992 | WIPO . |

OTHER PUBLICATIONS

Recommendation GSM 03.40, "Technical Realization of the Short Message Service—Point-to-Point", version 3.5.0, European Telecommunications Standards Institute, ETSI/PT 12, Feb. 1992, paragraphs 3.1 (pp. 10–11); 3.2.6 (pp. 13–14); 3.2.8 (p. 15); 4.1 (pp. 18–19); 5.2 (p. 20), 6–8 (pp. 20–25) and 10 (pp. 53–74).

Recommendation GSM 09.02, "Mobile Application Part Specification", version 3.8.0, European Telecommunications Standards Institute, ETSI, Jan. 1991; pp. 324–367.

IEE Colloquium on "GSM and PCN Enhanced Mobile Services", IEE, London, UK, 1991 (Conference date 30 Jan. 1991); pp. 7/1–7/5.

"Distributed Architechture for Applications based on the GSM Short Message Service", CSELT, G. Martini et al., pp. 140–145 1995.

"The Short Message Service—A New Service of Digital Mobile Communication", including English Translation, M. Heintz et al., pp. 517–526. Sep. 1993.

Primary Examiner—Curtis Kuntz
Assistant Examiner—William G. Trost
Attorney, Agent, or Firm—Cushman Darby & Cushman, L.L.P.

[57] ABSTRACT

A method and arrangement for processing short messages in a mobile services switching centre (GMSC) of a cellular radio network. The method comprises the following steps: an A-subscriber (AMS) sends a short message provided with the routing address of a B-subscriber (BMS); the routing address contained in the short message is checked in the mobile services switching centre (GMSC); and when the routing address is that of the B-subscriber (BMS), the mobile services switching centre (GMSC) request the routing information of the B-subscriber (BMS) from the home location register (HLR); if the B-subscriber can be reached, the home location register (HLR) sends the routing information to the requesting mobile services switching centre (GMSC); and the mobile services switching centre (GMSC) routes the short message to the B-subscriber (BMS) on the basis of the routing information received.

8 Claims, 3 Drawing Sheets

| MT | PI | MR | OA | DA | DATA |
|----|----|----|----|----|------|

FIG. 3

| GMSC ADDR | IMSI 1 |
|-----------|--------|
| GMSC ADDR | IMSI 2 |
|           |        |
|           |        |
|           |        |

METHOD AND ARRANGEMENT FOR PROCESSING SHORT MESSAGES IN A CELLULAR NETWORK

BACKGROUND OF THE INVENTION

The invention relates to a method and arrangement for processing short messages in a mobile services switching centre of a cellular network.

The invention operates in a cellular network that contains a mobile services switching centre. The network comprises a home location register for permanent storing of location and subscriber data on radio telephones registered in the network. The geographical area covered by the network is divided into smaller mobile services switching centre areas (MSC area), each of which comprises a visitor location register for temporary storing of subscriber data on radio telephones visiting the MSC area and a mobile services switching centre interconnected with the visitor location register. Each MSC area is further divided into location areas, which are divided into cells. Each cell comprises at least one base transceiver station that is capable of establishing a radio link with the active radio telephones located in the cell.

In different cellular radio systems or radio telephone systems currently used or planned, the geographical area covered by the system is divided into separate smaller radio areas or cells in such a way that when a radio telephone or mobile phone is in the cell, it communicates with a fixed network via a base transceiver station located in the cell. The mobile phones of the system may freely roam from one cell to another within the system. One of these systems is the digital mobile phone system GSM (Global System for Mobiles).

In cellular radio networks, it is known to transmit short messages to a short message service centre that is separate from a cellular radio network. Recommendation GSM 03.40, ETSI/PT, February 1992 includes a description of such a system transmitting short messages. It describes interconnection of a short message service centre with a mobile services switching centre of a cellular radio network and operation of this short message service centre as it transmits short messages from outside the cellular radio network and from one subscriber (A-subscriber) of the cellular radio network to another subscriber (B-subscriber) of the network, or to a communicating means outside the network capable of receiving and/or transmitting short messages. Recommendation GSM 04.11, ETSI/PT 12, February 1992 provides a more detailed description of transmission of short messages on a radio path between GSM terminal equipment, a mobile services switching centre and a short message service centre.

The above described art solutions and their practical applications have focused on communication by means of short messages between the subscribers of a cellular radio system and the communicating means outside the system capable of receiving and/or transmitting short messages. Known solutions of this kind have thus granted that a separate short message service centre which requires space and financial resources, must be connected to the system, although the centre requires new arrangements separate from those required by a cellular radio network to control it and render it compatible with the network.

SUMMARY OF THE INVENTION

The object of the present invention is to simplify transmission of short messages from an A-subscriber of a cellular radio system to a B-subscriber in a fast and inexpensive manner and without additional equipment.

According to the invention this new kind of method for processing short messages in a cellular radio network is characterised by the following steps: an A-subscriber sends a short message provided with the routing address of a B-subscriber; the routing address contained in the short message is checked in the mobile services switching centre; and when the address is that of the B-subscriber, the short message is stored A-subscriber-specifically in the short message storing means of the mobile services switching centre, the mobile services switching centre requests the routing information of the B-subscriber from the home location register, and if the B-subscriber can be reached, the home location register sends the routing information to the requesting mobile services switching centre, and the mobile services switching centre routes the short message to the B-subscriber on the basis of the routing information received.

The new kind of arrangement according to the invention for processing short messages in a cellular radio network is characterised by comprising an address processing means for checking the address contained in the short message; a storing means for storing the short message in a mobile services switching centre; a communicating means communicating with a home location register HLR and requesting routing information from the HLR; a short message transmitting means for transmitting short messages from a mobile services switching centre to a B-subscriber; a means for controlling transmission of short messages to instruct the storing means to store short messages, to instruct the communicating means to request the routing information of the B-subscriber from the HLR, to forward the routing information of the B-subscriber received from the HLR from the communicating means, and to transmit the short message from the storing means to the short message transmitting means in response to the short message sent by the A-subscriber and provided with the address of the B-subscriber, and to send an acknowledgement to the A-subscriber.

In practicing the invention, all the measures needed for transmission of short messages are taken into a mobile services switching centre. This allows fast and inexpensive transmission of short messages from an A-subscriber of a cellular radio network to a B-subscriber.

The advantage of this kind of method and arrangement for processing short messages in a cellular radio network is that no separate short message service centre SC is needed for transmission of short messages from an A-subscriber of a cellular radio network to a B-subscriber. A separate SC is expensive and inconvenient since it requires its own control system and an interconnection as defined in GSM 03.40 with a mobile services switching centre. A separate SC also requires separate maintenance and space on the premises of a teleoperator. Particularly in telecommunication networks where there is no need to transmit short messages between a mobile phone system and other message transmitting services, a separate SC is not needed but transmission of short messages in a mobile phone network can be carried out in accordance with the present invention.

In addition, the prior art arrangement for transmitting short messages has not allowed the B-subscriber to send an acknowledgement to the A-subscriber to show that it has received the short message transmitted. The system of the invention, however, offers a multiple choice of functions of acknowledgement. For example, in the system of the invention it is possible to send an acknowledgement to the A-subscriber to show whether the B-subscriber has received the short message or whether the short message is, e.g., temporarily stored for re-transmission. The acknowledgement may be a conventional acknowledgement according to GSM 03.40, or a short message.

BRIEF DESCRIPTION OF THE DRAWING

In the following the invention is described in greater detail with reference to the attached drawings, wherein:

FIG. 3 shows the frame structure of a short message according to the invention, FIG. 4 shows a message waiting data list according to the invention in the HLR.

In the following, the method of the invention will be described in relation to the GSM, which is in fact where the invention is primarily applied. However, the method of the invention can be applied to other similar radio systems or modifications of the GSM. The basic structure and functions of the GSM are well known to those skilled in the art and they are defined relatively accurately in the specifications of the GSM, particularly in GSM recommendations 01.02, 11.30, 11.31, 11.32 and 03.40. Some of the basic concepts of the GSM and elements relevant to the invention are defined below, with reference to FIG. 1. An area in which GSM services are available is called a GSM network (GSM service area) and it may cover several countries. A GSM network may divide into national GSM networks (PLMN service area), each of which is an area covered by one operator providing GSM services. Several GSM networks may exist in one country, and the geographical areas covered by them may overlap. In the following, the term "mobile phone system" refers primarily to such a national mobile phone system, and the system may be connected to other national mobile phone systems or other communication systems, such as a public telephone network.

A national GSM network may comprise one or more MSC areas, which are areas in which services are provided by one mobile services switching centre. An MSC area of the GSM may in turn divide into one or more location areas, which are areas covered by a plurality of cells. A cell is the smallest geographical area in the system. It comprises one or more base transceiver stations and employs defined communication channels.

A national GSM network generally comprises one home location register HLR, which is a database in which the data of a mobile phone, e.g. location data, are permanently stored. The system further comprises several visitor location registers VLR, one or more per each MSC area. A VLR is a database in which the data of a mobile phone are stored when the mobile phone is visiting the area of the VLR. A VLR can locate a mobile phone MS with an accuracy of one location area. An HLR, on the other hand, has information indicating the VLR the area of which the MS is visiting, and it gives the routing information for the calls to the MS to the telephone network. The HLR receives the necessary routing information from the VLR. The HLR and VLR have only a signalling connection with the other components of the mobile phone network.

Figure 1:
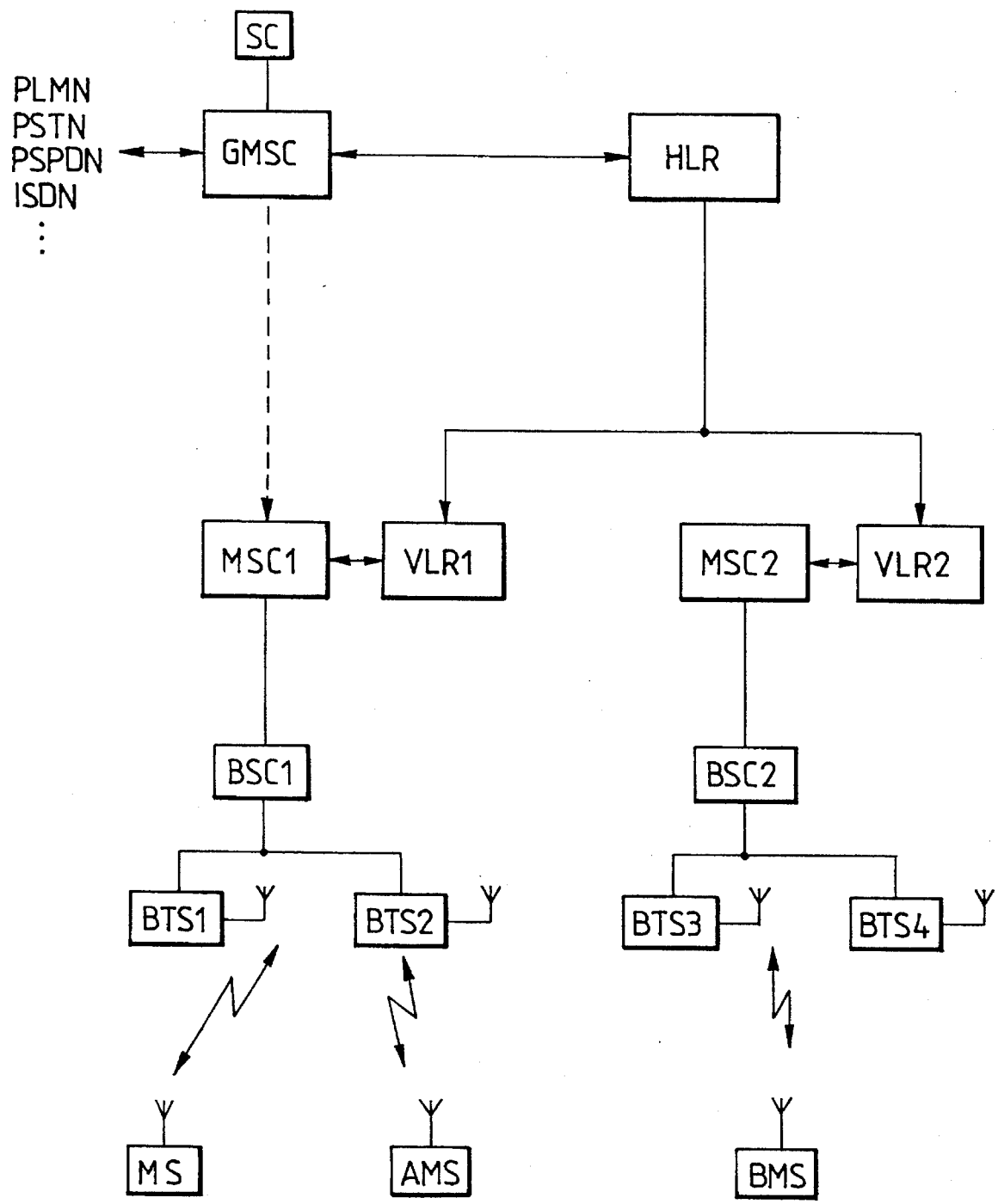
FIG. 1 shows a schematic view of a cellular radio system to which the method and system according to the invention can be applied.

For purposes of simplicity, the method of the invention is described as applied to the system of FIG. 1, in which each MSC area has its own VLR interconnected with the mobile services switching centre MSC of the MSC area in question.

The solution of FIG. 1, which is typical of the invention, illustrates two MSC areas, one of which includes a mobile services switching centre MSC1 and a visitor location register VLR1, while the other includes a mobile services switching centre MSC2 and a visitor location register VLR2. Each MSC area divides into one or more location areas, and in each location area traffic is controlled by a base station controller BSC, which controls several base transceiver stations BTS. Each cell mentioned above comprises one BTS, and one BSC serves several cells. A mobile station MS in a cell has a bidirectional radio link with the BTS of the cell in question. Between the BSC and the MSC there are both a signalling connection and voice channels.

In FIG. 1, the MSC1 controls the base station controller BSC1, which in turn controls the base transceiver stations BTS1 and BTS2. Correspondingly, in another MSC area the MSC2 controls a location area which contains the BSC2 and the BTS3 and BTS4.

A GSM network is usually connected to other networks, such as a Public Switched Telephone Network (PSTN), a Public Land Mobile Network (PLMN), a Packet Switched Public Data Network (PSPDN) or an Integrated Services Digital Network (ISDN), via a defined MSC called a gateway MSC (GMSC). One or more (all) of the MSCs of the network may operate as the GMSC. It is possible to connect a voice channel from the GMSC to any other MSC of the network. The GMSC also has a signalling connection with the HLR. The HLR in turn has a signalling connection with VLRs. Alternatively, a switching centre of another communication system, e.g. an ISDN centre, may operate as the GMSC.

FIG. 1 further describes a B-subscriber mobile station BMS to which an A-subscriber AMS is attempting to send a short message.

Figure 2:
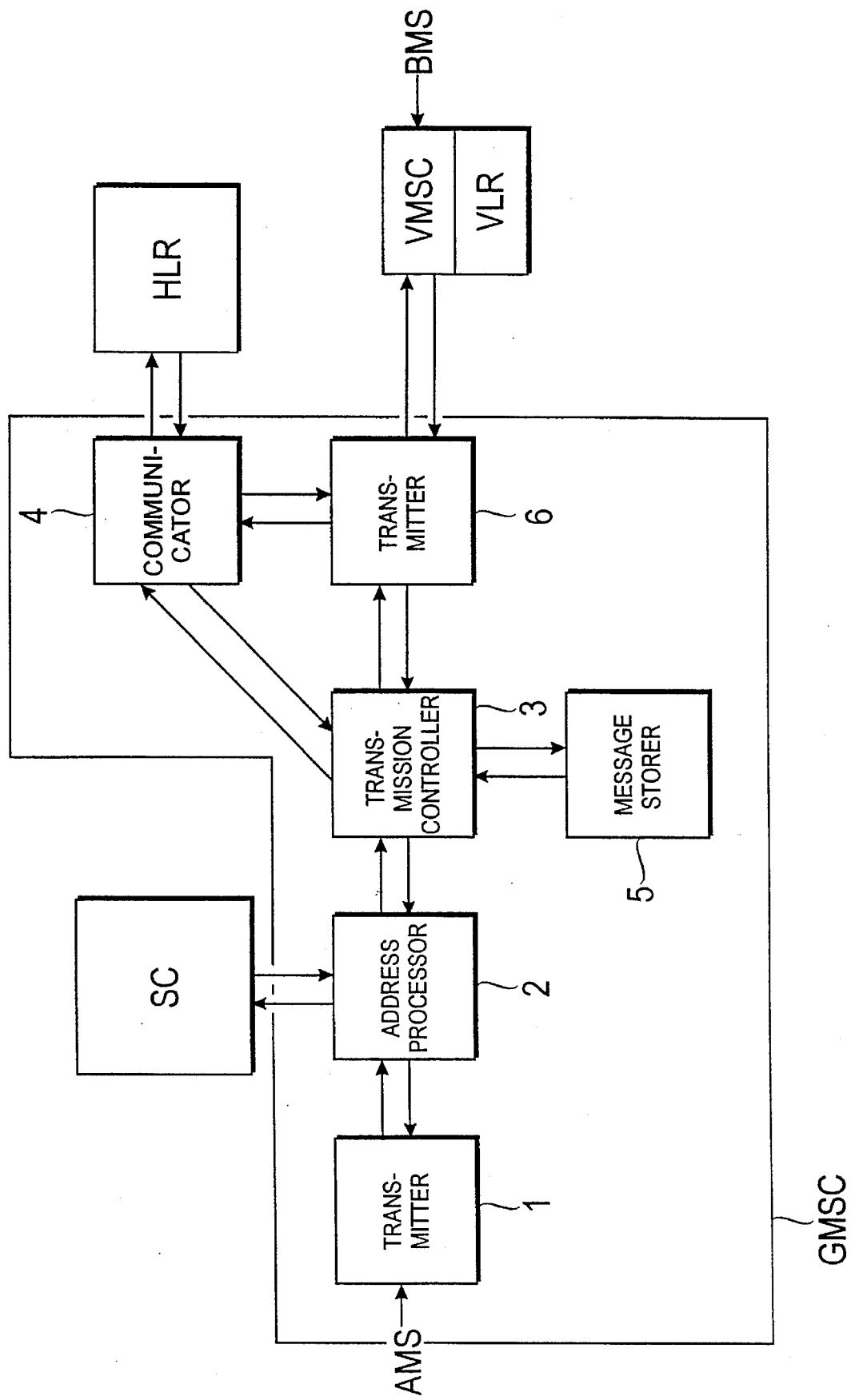
FIG. 2 shows the transmitting parts of a mobile services switching centre according to the invention that is capable of independently transmitting short messages.

FIG. 2 shows the transmitting parts of a mobile services switching centre GMSC of the invention that is capable of independently transmitting short messages. An A-subscriber AMS of the network sends a short message, which has a structure as shown in detail in FIG. 3, to the GMSC. This short message is defined in GSM 04.11, point 7.3.1. The short message comprises an RP message type indicator field (MT), an RP priority indicator field (PI), an RP message reference field (MR), an RP originator address field (OA), an RP destination address field (DA), which in the prior art solution contained the SC address described in GSM 04.11, point 8.2.5.2. In the present solution, the DA of the RP-DA field is the address of the B-subscriber, by which the message is routed to the B-subscriber. The short message also comprises an RP-user data field (DATA). FIG. 2 further shows a means 1 in an MSC for transmitting a short message from a mobile phone, the means being described in GSM 03.40, paragraph 9. In the prior art solution, the means reads the address of the SC from the RP-DA field of the short message and transmits the short message to the SC for forwarding. In the solution of the invention, the A-subscriber AMS sets the address of the B-subscriber in the RP-DA field, and the means 1 for transmitting a short message originated in an MS reads it and sends the short message to an address processing means 2, which reads the DA of the RP-DA field to detect where the short message is to be transmitted. If the RP-DA field contains the address of the SC, the short message is sent there; and if the RP-DA field contains the address of the B-subscriber, the short message is sent to a means 3 for controlling transmission of short messages, for further transmission to the B-subscriber BMS. Possible connection of an SC to a cellular radio network is described in GSM 03.40, Appendix 1, ETSI. The means 3 for controlling transmission of short messages instructs a means 4 communicating with the HLR, the standard functions of this communicating means being described in GSM 09.02, point 5.13.1.2.1., to request the routing information of the B-subscriber BMS from the HLR of the B-subscriber by means of a send routing information for short message service routine. If the HLR contains the information on the location of the B-subscriber, the routing information is transmitted to the communicating means 4, which forwards them to the means 3 for controlling transmission of short messages. The controlling means 3 instructs a short message transmitting means 6 to send the short message, in the manner described in GSM 09.02, point 5.13.2.2.1, to the VMSC the MSC area of which the B-subscriber is visiting the into which VMSC the VLR is typically integrated. If the B-subscriber cannot be reached, the HLR announces this to the means 4 communicating with the HLR. The communicating means forwards the information to the means 3 for controlling transmission of short messages, which instructs a storing means 5 in an MSC to store the short message until the B-subscriber can again be reached and the short message can be transmitted to it.

In the prior art solution, if the B-subscriber cannot be reached, a message waiting data list according to GSM 03.40 is formed to the HLR. In the list are stored, B-subscriber-specifically, the addresses of the short message service centres SC in which short messages are stored for transmission to the B-subscriber. In the solution of the invention, the list of waiting messages has been modified to contain the address of the GMSC (GMSC addr) in which the short messages sent to the B-subscriber are stored, and the international mobile subscriber number (IMSI1, IMSI2) of the A-subscriber. FIG. 4 shows the message waiting data list according to the invention in the HLR. As the B-subscriber re-registers in the area of the VMSC, the VLR of the VMSC sends a message to the HLR of the B-subscriber stating that the B-subscriber can again be reached. After receiving this message, the HLR sends an alert to the GMSC of the A-subscriber stating that the B-subscriber is again reachable. In the solution obtained by practicing the present invention, the HLR adds the IMSI of the A-subscriber and the mobile station international PSTM/ISDN number (MSISDN) of the B-subscriber from its message waiting data list to the alert so that the GMSC can identify the subscriber that has become within reach and the subscriber that has called. Having reached the alert, the means 4 communicating with the HLR of the GMSC forwards the alert to the means 3 for controlling transmission of short messages. The controlling means initiates transmission of the short message to the B-subscriber via the VMSC of the location area of the B-subscriber.

The drawings and the description thereof are be to understood only as illustrating the idea of the invention. The method and arrangement of the invention for processing short messages in a cellular radio network may vary in details within the scope of the claims. Although the invention is described above mainly in the GSM, the method and arrangement for processing short messages in a cellular radio network can also be used in other kinds of radio systems.

I claim:

1. A method for transferring a short message from an A-subscriber to a B-subscriber in a cellular network that has a mobile services switching centre and a home location register, comprising:

(a) storing and updating in said home location register information as to whether said B-subscriber is reachable by said mobile services switching centre, and, if so, storing in said home location register routing information for said B-subscriber;

(b) sending, by an A-subscriber, a short message containing a routing address of a B-subscriber, to the mobile services switching centre;

(c) checking, by the mobile services switching centre of said routing address, whether said routing address is of said B-subscriber, and, if so, requesting by the mobile services switching centre from the home location register, of routing information for said B-subscriber;

(d) if said B-subscriber is reachable by said mobile services switching centre according to said information stored in said home location register, sending in response to said requesting, routing information for said B-subscriber by said home location register to said mobile services switching centre; and (e) based on receipt of said routing information by said mobile services switching centre, routing, by said mobile services switching centre, of said short message to said B-subscriber.

2. The method of claim 1, wherein said mobile services switching centre includes a short message storer, said method further comprising:

storing said short message A-subscriber specifically in said short message storer.

3. The method of claim 2, further comprising:

after step (c), if said B-subscriber is not reachable by said mobile services switching centre according to said information stored in said home location register, said home location register announcing such unreachability to said mobile services switching centre; and setting said home location register to initiate step (d) upon storage in said home location register as a result of conducting the updating of step (a).

4. The method of claim 1, further comprising:

(f) sending, by said mobile services switching centre, to said A-subscriber, an acknowledgement of reception by said B-subscriber of said short message as a result of said routing conducted in step (e).

5. The method of claim 2, wherein:

if performance of step (e) is inhibited due to the unreachability of the B-subscriber, repeating step (e) using said message as stored in said message storer.

6. An arrangement for transferring an address-containing short message from an A-subscriber to a B-subscriber in a cellular network, comprising:

a home location register; and a mobile services switching centre, including:

an address processor for checking the address contained in a short message sent by the A-subscriber to said mobile services switching centre;

a message storer for storing said short message;

a communicator communicating with said home location register for requesting routing information from said home location register for a B-subscriber having said address;

a short message transmitter for transmitting said short message to said B-subscriber; and a transmission controller for instructing said message storer to store said short message, for instructing said communicator to request routing information for said B-subscriber from said home location register, for forwarding said routing information as received from said home location register by said communicator, for transmitting said short message from said message storer to said short message transmitter, and for sending an acknowledgement to the A-subscriber that said short message has been transmitted to said B-subscriber.

7. The arrangement of claim 6, wherein:

the communicator is arranged to communicate a routing address for said A-subscriber to said home location register; and said home location register includes a subscriber-specific list containing both a routing address for said mobile services switching centre and said routing address for said A-subscriber.

8. The arrangement of claim 6, wherein:

said message storer is arranged to store said short message A-subscriber-specifically.

\* \* \* \* \*